United States Patent
Ogino

(10) Patent No.: US 6,909,520 B2
(45) Date of Patent: Jun. 21, 2005

(54) PRINTING SYSTEM FOR SELECTING A DESIRED PRINTER FROM PLURAL PRINTERS CONNECTED TO A NETWORK

(75) Inventor: Junichi Ogino, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 881 days.

(21) Appl. No.: 09/757,650

(22) Filed: Jan. 11, 2001

(65) Prior Publication Data

US 2002/0054320 A1 May 9, 2002

(30) Foreign Application Priority Data

Jan. 18, 2000 (JP) .................................. P2000-009070

(51) Int. Cl.⁷ ............................................ G06K 15/00
(52) U.S. Cl. ..................................... 358/1.15; 358/1.13
(58) Field of Search .......................... 358/1.1, 1.7, 1.9, 358/1.12, 1.13, 1.15, 402, 401, 451

(56) References Cited

U.S. PATENT DOCUMENTS

| | | | | |
|---|---|---|---|---|
| 5,228,118 A | * | 7/1993 | Sasaki ........................ | 358/1.13 |
| 5,287,194 A | * | 2/1994 | Lobiondo ................... | 358/296 |
| 5,353,388 A | * | 10/1994 | Motoyama ................. | 358/1.18 |
| 5,467,434 A | * | 11/1995 | Hower et al. .............. | 358/1.15 |
| 5,625,757 A | * | 4/1997 | Kageyama et al. ........ | 358/1.14 |
| 6,348,971 B2 | * | 2/2002 | Owa et al. ................. | 358/1.15 |
| 6,631,008 B2 | * | 10/2003 | Aoki ......................... | 358/1.15 |
| 6,644,194 B2 | * | 11/2003 | Yamamoto et al. ......... | 101/484 |
| 2001/0043357 A1 | * | 11/2001 | Owa et al. ................. | 358/1.15 |

FOREIGN PATENT DOCUMENTS

| | | |
|---|---|---|
| JP | 6-242897 | 9/1994 |
| JP | 11-110161 | 4/1999 |
| JP | 11-119941 | 4/1999 |
| JP | 11-184656 | 7/1999 |
| JP | 11-203077 | 7/1999 |
| JP | 11-345100 | 12/1999 |

* cited by examiner

*Primary Examiner*—Gabriel Garcia
(74) *Attorney, Agent, or Firm*—Nath & Associates PLLC; Gregory B. Kang; Derek Richmond

(57) ABSTRACT

According to the disclosed invention, printer drivers of a plurality of printers for executing print operations are automatically sequentially selected, and print processes are executed by using the selected printer drivers to realize a plurality of efficient print processes. Therefore, effort and time required to the multiple print process can be considerably reduced.

6 Claims, 7 Drawing Sheets

FIG. 5A

| PRINTER RANK SETTING | | | |
|---|---|---|---|
| EVENT | | PRIORITY RANK | |
| TYPE OF APPLICATION | ⇒ | 1 | COLOR/MONO |
| RESOLUTION | ⇒ | 2 | NO. OF COPIES |
| | ⇒ | 3 | PAPER SIZE |
| | ⇒ | 4 | ACTION FOR BUSY/ERROR |
| | ⇒ | 5 | |
| | ⇒ | 6 | |

[OK] [CANCEL]

PRINTER CONDITION SETTING

LIST OF PRINTERS:
- PRINTER A
- PRINTER B
- PRINTER C
- PRINTER D
- PRINTER E
- PRINTER F
- PRINTER G

=

SETTING OF PRINTER A
- 1  ⊙ COLOR  ○ MONO
- 1  NO. OF COPIES [1-100]
- 1  PAPER SIZE [A4 ▽]  ⊙ VERTICAL  ○ LATERAL
- 1  WHEN BUSY PRINT BY [PRINTER B ▽]
- 1  APPLICATION [doc,xls,.pm85·]
- 1  RESOLUTION [600dpi ▽]

[OK] [CANCEL]

FIG. 7A

| 1 | 2 | 3 | 4 | 5 |
|---|---|---|---|---|
| COLOR/ MONO | NO. OF COPIES | PAPER SIZE | ACTION OF BUSY (INCLUDING ERROR) | TYPE OF APPLICATION (FILE) |

FIG. 7B

| PRINTER A | 1,[MONO]/2,[1-9]/3,[A4 OR LESS]/4,[TO PRINTER B]/5,[doc,txT,Xls] |
|---|---|
| PRINTER A | 1,[MONO]/2,[10-9999]/3,[A3 OR LESS]/4,[TO PRINTER A] |
| PRINTER A | 1,[COLOR]/5,[pm85] |

FIG. 7C

| CASE 1 PROPERTY SETTING<br>1,[MONO]/2,[12]/3,[A5]/4,[TO PRINTER A] | →SELECT PRINTER B<br>→PRINTER B ERROR<br>→PRINT BY PRINTER A |
|---|---|
| CASE 2 PROPERTY SETTING<br>1,[MONO]/2,[2]/3,[A4]/4,[TO PRINTER B] | →SELECT PRINTER A<br>→PRINTER A IDLING<br>→PRINT BY PRINTER A |
| CASE 3 PROPERTY SETTING<br>1,[COLOR] | →PRINT BY PRINTER C |
| CASE 4 PROPERTY SETTING<br>5,[pm85] | →PRINT BY PRINTER C |

PRINTING SYSTEM FOR SELECTING A DESIRED PRINTER FROM PLURAL PRINTERS CONNECTED TO A NETWORK

CROSS REFERENCE TO RELATED APPLICATIONS

The subject application is related to subject matter disclosed in the Japanese Patent Application No.Tokugan2000-9070 filed in Jan. 18, 2000 in Japan, to which the subject application claims priority under the Paris Convention and which is incorporated by reference herein.

BACKGROUND OF THE INVENTION

1. Field of the Invention

The present invention relates to a printing system and a printing method for printing by a selected printer by selecting a desired printer from plural printers connected to a network, and a computer-readable recording medium storing a printing program, and more particularly to a technology of enhancing the printing efficiency substantially.

2. Description of the Related Art

In a computer system, generally, a printer driver is preset by default in order to control the printing for issuing printing data to a printer connected to itself, and printing through the computer system is executed by the default printer corresponding to this printer driver. Accordingly, in a printing system in which the computer system is connected to a network such as LAN (local area network), and printing data can be issued to plural printers, if the user wishes to execute printing by other printer than the default printer, the user has to change over the printer driver from the default one to the desired printer by manual operation, and then the printing is executed.

Thus, in the existing printing system, the printer driver is set by default in the computer system, and if the user wishes to print by other printer than the default one, the user has to change over the printer driver from the default one to a desired printer by manual operation, and such conventional printing system involves the following problems to be solved.

First, in the conventional printing system, as mentioned above, since the printer driver is preset in the computer system by default, color data may be printed in monochromatic data, or printing data of a certain page descriptive language is printed by a printer not supporting the same page descriptive language, and data may be printed by a printer not suited to desired printing, and thus the efficiency of printing is very poor.

Second, in the conventional printing system, while a third party is printing a huge mass of printing data, or when paper jamming or other error occurs in the printer, the user has to check the status monitor showing the present situation of the printer, or examine the printer, and then finally learns that the own printing data cannot be printed, and the time loss for printing is significant, and it is had to realize efficient printing.

Thus, in the conventional printing system, since one printer driver is preset in the computer system by default, if desired to print by using other printer than the default one, the user has to select other printer driver by manual operation and execute the printing, and the efficiency of printing is extremely low.

SUMMARY OF THE INVENTION

The invention is devised in the light of the above technical problems, and it is hence an object thereof to present a printing system capable of enhancing the efficiency of printing substantially.

It is another object of the invention to present a printing method capable of enhancing the efficiency of printing substantially.

It is a further object of the invention to present a computer-readable recording medium storing a printing program capable of enhancing the efficiency of printing substantially.

To solve the technical problems, the present inventor attempted to provide the computer system with means for selecting automatically a printer driver optimum for printing the printing data from plural printer drivers according to the printing conditions preset by the user, and starting the printing, and learned that the efficiency of printing can be enhanced substantially because printing can be executed by a printer optimum for printing of printing data without user's consciousness, and further continued intensive studies and finally invented the technology having the following features.

A first aspect of the invention based on such concept is a printing system for printing by a selected printer by selecting a desired printer from plural printers connected to a network, that is, a printing system comprising a printing condition memory for storing the printing condition set by the user, a printer driver selector for selecting a printer driver optimum for printing of the printing data by referring to the printing condition, and a status judging unit for judging the status of the printer corresponding to the selected printer driver, in which the printing condition memory further comprises a priority rank memory for storing the priority rank of printing property of printing data, and a printer condition memory for storing the printing condition of every printer of printing data.

As a result, the efficiency of printing can be enhanced significantly.

A second aspect of the invention based on such concept is a printing method for printing by a selected printer by selecting a desired printer from plural printers connected to a network, that is, a printing method comprising a step of setting the priority rank of printing property of printing data, a step of setting the printing condition of each printer of printing data, a printing property input step of entering printing property of printing data for executing printing, a printer driver selecting step of selecting a printing driver optimum for printing of the printing data by referring to the entered printing property, priority rank of printing property, and printing condition of each printer, a printer driver calling step of starting a selected printer driver, and a printing step of executing printing by a printer corresponding to the selected printer driver.

As a result, the efficiency of printing can be enhanced significantly.

A third aspect of the invention based on such concept is a computer-readable recording medium storing a printing program for printing by a selected printer by selecting a desired printer from plural printers connected to a network, that is, a computer-readable recording medium storing a printing program for making a computer execute the operation comprising a process of setting the priority rank of printing property of printing data, a process of setting the printing condition of each printer of printing data, a printing property input process of entering printing property of printing data for executing printing, a printer driver selecting process of selecting a printing driver optimum for printing of the printing data by referring to the entered printing property, priority rank of printing property, and printing condition of each printer, a printer driver calling process of starting a selected printer driver, and a printing process of executing printing by a printer corresponding to the selected printer driver.

As a result, the efficiency of printing can be enhanced significantly.

As the recording medium, herein, semiconductor memory, magnetic disk, optical disk, magneto-optical disk, or magnetic tape may be preferably used.

The printing property may include color or monochromatic selection of printing of printing data, number of copies, printing paper size, countermeasure in case of busy printer or error, type of application, and resolution.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 5 is a diagram showing a priority rank setting screen and a printer condition setting screen in an embodiment of the invention.

FIG. 7 is a diagram showing an example of experiment of printing by using a printing method in an embodiment of the invention.

DETAILED DESCRIPTION OF THE PREFERRED EMBODIMENTS

Figure 1:
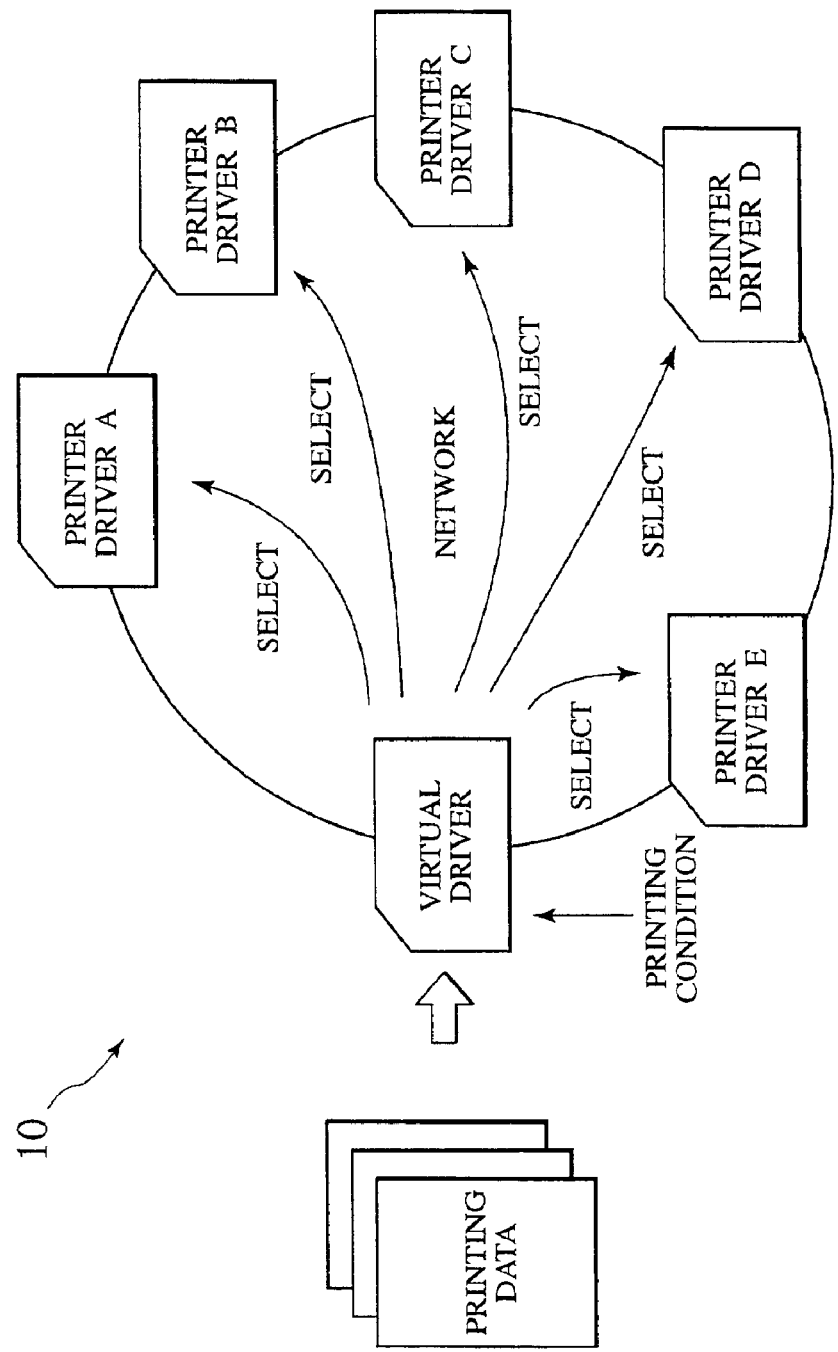
FIG. 1 is a schematic diagram showing a configuration of a printing system in an embodiment of the invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Referring now to FIG. 1 through FIG. 7, the structure and operation of a printing system, a printing method, and a computer-readable recording medium storing a printing program in preferred embodiments of the invention are described below.

First, the configuration of the printing system in an embodiment of the invention is explained.

FIG. 1 is a schematic diagram showing a configuration of a printing system in an embodiment of the invention.

In a printing system 10 according to the embodiment of the invention, a virtual printer driver (called virtual driver hereinafter) capable of controlling the printing process by all printer drivers A, B, C, D, E installed in the system is provided in the computer system, and this virtual driver refers to the printing condition preset by the user, and automatically selects a real printer driver optimum to printing of printing data from plural printer drivers, and executes the printing operation.

A specific composition of the virtual driver is explained.

Figure 2:
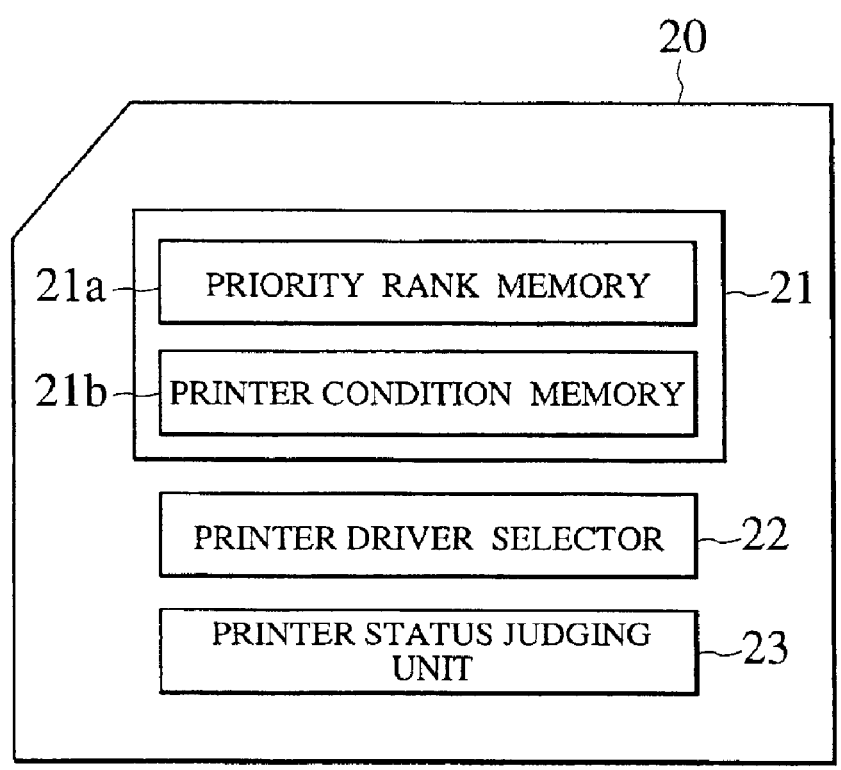
FIG. 2 is a block diagram showing a constitution of a printing device in an embodiment of the invention.

FIG. 2 is a block diagram showing a configuration of the virtual driver in the embodiment of the invention.

A virtual driver 20 in the embodiment of the invention comprises, as shown in FIG. 2, a printing condition memory 21 for storing the printing condition set by the user, a printer driver selector 22 for selecting a printer driver optimum for printing of the printing data by referring to the printing condition in the printing condition memory 21, and a status judging unit 23 for judging the status of the printer corresponding to the printer driver selected by the printer driver selector 22, in which the printing condition memory 21 further comprises a priority rank memory 21a for specifying and storing the priority rank of the property of printing data in the process of printing, and a printer condition memory 21b for setting and storing the printing condition of every printer of printing data.

Herein, the "property of printing data" means the information relating to printing of data, such as selection of color or monochromatic printing, number of copies, printing paper size, countermeasure (for example, printing by other printer, stopping of printing, waiting) in case of busy printer (engaged in other printing operation) or error (such as paper jamming), type of application (file), and resolution. For example, when the user presets the priority rank of property of printing data by using a priority rank setting screen 50 as shown in FIG. 5A, the printing data is printed according to this priority rank.

That is, when the user sets the priority rank of printing of the printing data as shown in FIG. 5A, printing of printing data is executed by priority of color and monochromatic selection (rank 1) over the number of copies (rank 2), and for example if the property is specified as color printing of 50 copies, between the printer capable of printing 50 monochromatic copies and the printer capable of printing 30 color copies, the printer driver corresponding to the latter printer capable of printing 30 color copies is automatically selected and printing is executed.

The "printing condition of printer" means the information relating to printing in each printer, such as selection of color or monochromatic printing, number of copies, printing paper size, paper direction (vertical or lateral), countermeasure in case of busy printer or error, type of application (file), and resolution, and before execution of printing, the user presets by using the printing condition setting screen 51 shown in FIG. 5B. A printer list window in the printer condition setting screen 51 displays all printer driver names installed in the computer system to be used by the user.

When the printing system operates on a network, and plural printers are connected to the network, preferably, the network administrator installs real printer drivers (corresponding to plural printers) and virtual driver in the server computer, and presets the priority rank of property of printing data and printing condition of printers in the server computer. As a result, the user in the network an execute printing efficiently by using each printer on the network only by sharing the virtual driver in the server computer. Herein, the network includes LAN (local area network), WAN (wide area network), and all other electric networks.

The printing method in an embodiment of the invention is explained.

Figure 3:
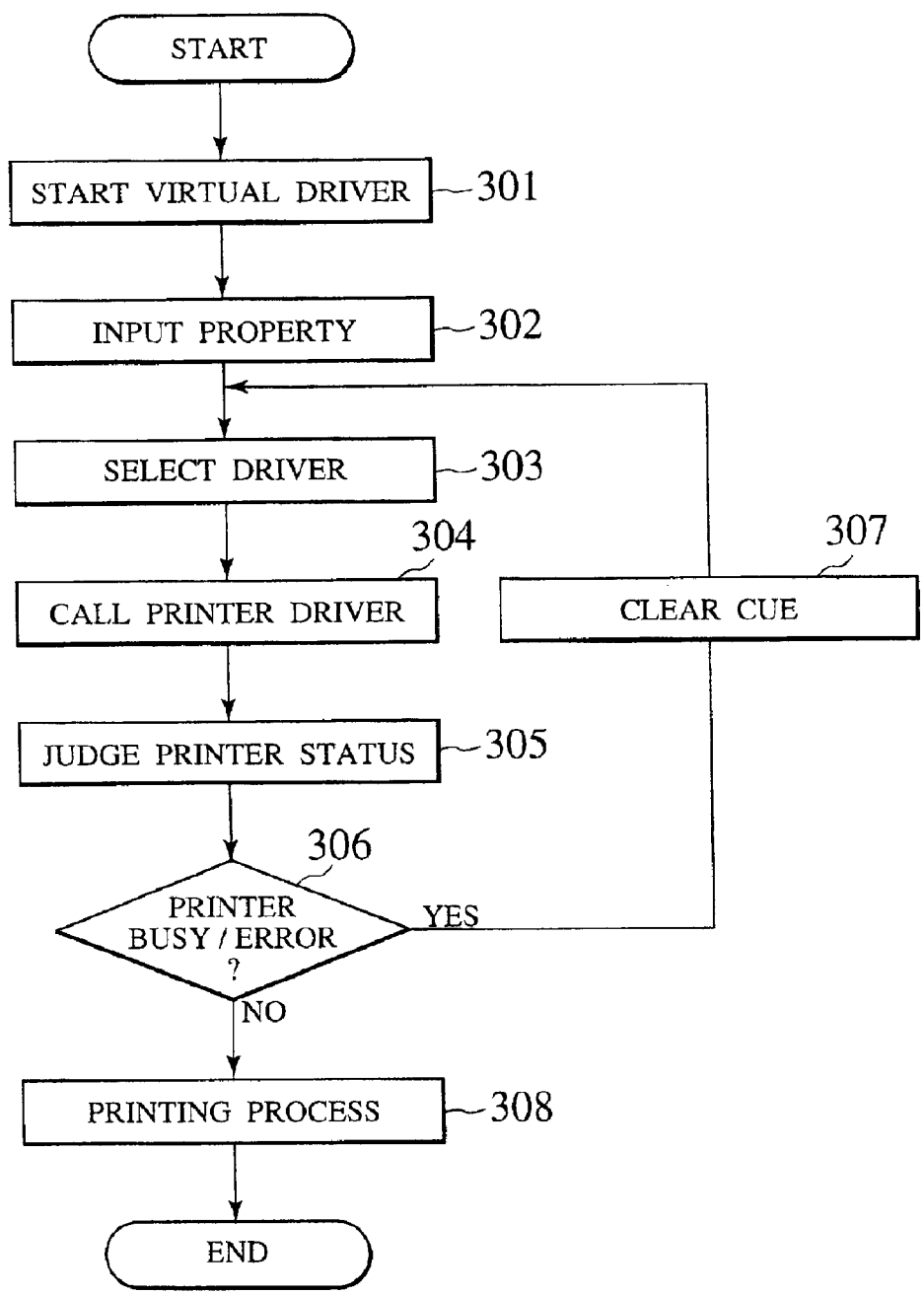
FIG. 3 is a flowchart showing a printing method in an embodiment of the invention.

FIG. 3 is a flowchart showing the printing method of the embodiment of the invention.

The printing operation by using the printing method of the embodiment of the invention is executed in the following steps.

(1) Starting the virtual driver 20 through a printing screen 60 (FIG. 6A) for starting the printing process (virtual driver starting step 301).

(2) Entering printing property such as number of copies and paper size of printing data for executing printing, through property input screen 61 (see FIG. 6B), by pushing property button 60*a* in the printing screen 60 and starting the property input screen 61 (property input step 302).

(3) Selecting printer driver optimum to printing of printing data by the printer driver selector 22, by referring to the printing property entered through the printing property input screen 61, and the priority rank of printing property and printing condition of printer stored in the printing condition memory 21 (driver selecting step 303).

(4) Starting the selected printer driver (printer driver calling step 304).

Figure 6A:
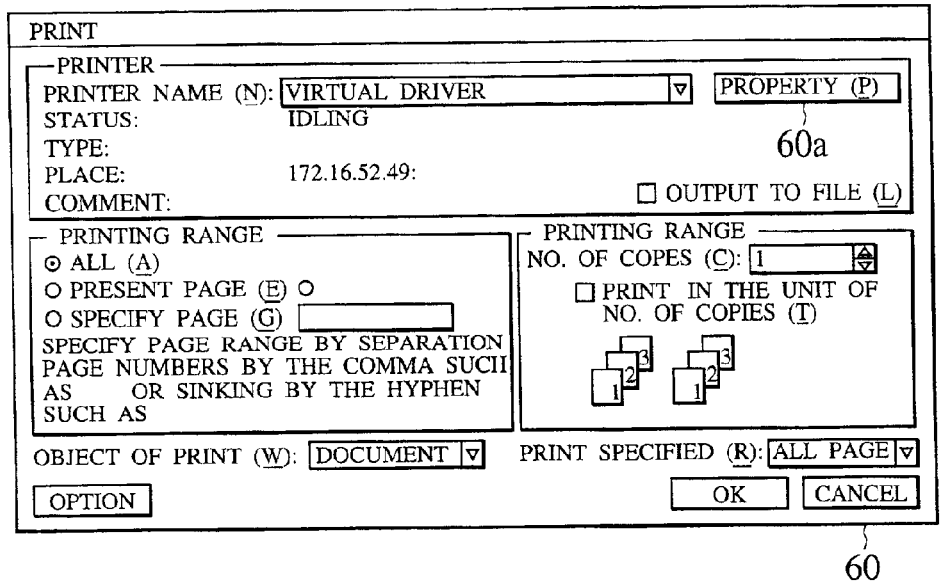
FIG. 6 is a diagram showing a printing screen, a property input screen, and a printer status display screen in an embodiment of the invention.
Figure 6B:
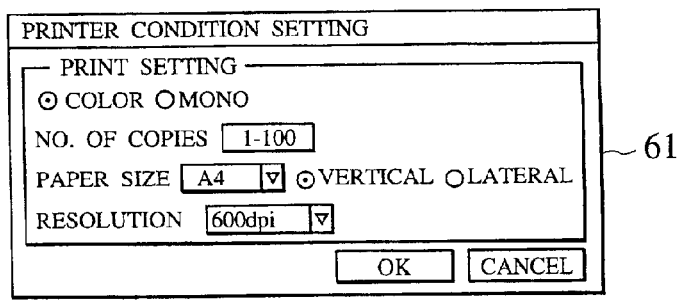
Figure 6C:
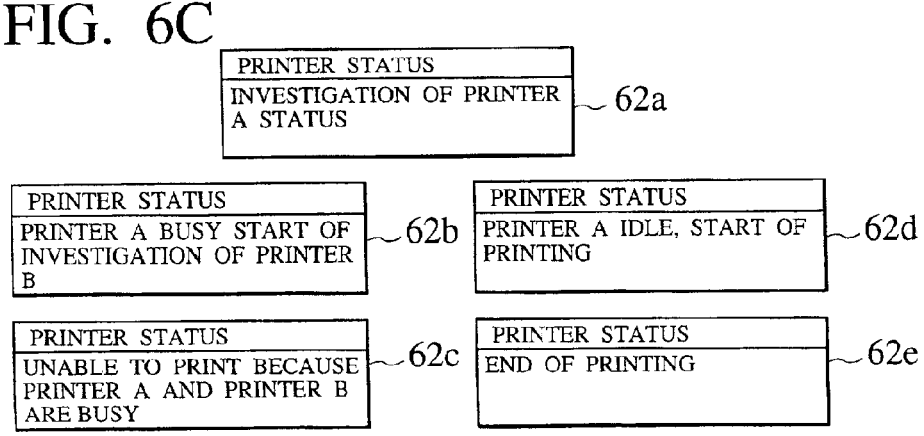

(5) Judging the status of the printer corresponding to the selected printer driver by the printer status judging unit 23, and informing the user of the judging result through, for example, the printer status display screen shown in FIG. 6C (printer status judging step 305). As a result of judgement, in the event of busy printer or error, the process goes to cue clearance step 307, or in the event of neither busy printer nor error, the process goes to printing step 308.

(6) Clearing the cue and stopping the printing process by informing the user of discontinuation of execution of printing of printing data through printer status display screen such as 62*c*, 62*d*, and returning to driver selecting step 303 (cue clearing step 307).

(7) Executing printing in a printer optimum for printing by informing the user of start of printing through the printer status display screen 62*d* (printing step 308). After the printing process, the end of printing is noticed to the user through the printer status display screen such as 62*e*.

Thus, in the printing system and printing method according to the embodiment of the invention, by presetting the priority rank of property of printing data and printing condition of each printer, when executing the printing process, the virtual printer driver refers to the property of printing data, and the preset priority rank of property of printing data and printing condition of printers, and automatically selects the printer driver optimum to printing of the printing data, and printing is executed by the selected printer driver, and therefore the user not familiar with the printing process can execute the printing efficiently, for example, by printing by using the color printer in the case of color printing, or by using the stencil printing machine in the case of printing 10 or more copies.

Figure 4:
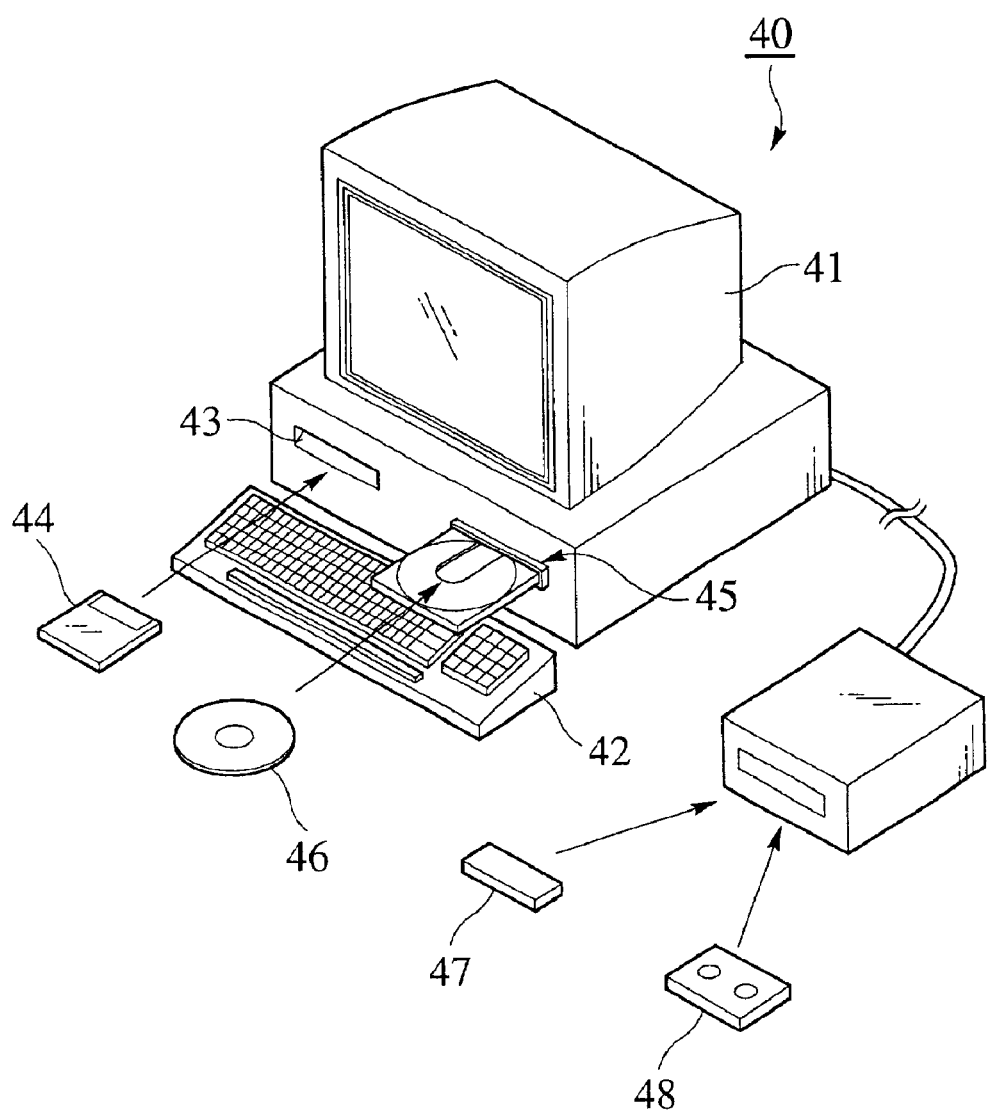
FIG. 4 is a schematic diagram showing an outline of a printing control device in an embodiment of the invention.

The computer system has, for example, a structure as shown in FIG. 4. That is, it comprises a floppy disk driver 43 and an optical disk driver 45, and a floppy disk 44 is inserted into the floppy disk driver 43, and an optical disk 46 is inserted into the optical disk drive 45, and by the specified reading operation, the program stored in these recording media can be installed in the system. Or by connecting a specified drive device, for example, by using a ROM 47 playing the role of a memory device, or a cartridge 48 playing the role of a magnetic tape device, the program can be installed and the data can be read and written. Further, the user can monitor the output information about the printing process through the display 41, or can enter the input information about the printing process through the keyboard 42. Although not shown herein, the mouse or pointer may be used as the input device.

The virtual driver 20 in the embodiment of the invention may be prepared as a program, and saved in a computer-readable recording medium. When executing the printing process, this recording medium is read by the computer system, and the program is stored in the memory of the computer system, and by executing the printing program by the operation unit, the printing method of the invention can be realized. Herein, the recording medium includes all computer-readable recording media capable of recording the program, such as semiconductor memory, magnetic disk, optical disk, magneto-optical disk, and magnetic tape.

Finally, for the understanding of the printing system and its method according to the embodiment, an experiment of printing process by using the printing system of the embodiment is briefly explained below.

Suppose the priority rank of property of printing data and printing condition of each printer are set as shown in FIGS. 7A and 7B, if the property of printing data is as shown in the left column of FIG. 7C, in the printing system and method of the embodiment, the printer driver corresponding to the printer shown in the right column of FIG. 7C is selected automatically, and printing is executed.

In case 1, for example, the printing operation by using the printing system of the embodiment is explained below.

As set in case 1, the property of printing data is monochromatic, the number of copies is 12, the printing paper size is A5, and printing is executed by printer A in case the selected printer is busy (including error state) (see the left column of FIG. 7C). Therefore, the virtual printer refers first to the priority rank of property of printing data set by the user, and judges to print the printing data by priority of color and monochromatic selection. In this case, two printers A and B conform to this condition, and therefore the virtual printer refers to the printing property of the next priority rank (in this case, number of copies), and automatically selects the printer driver corresponding to printer B capable of printing more than 10 copies, out of printers A and B, and starts printing. In this example, however, since the printer B is in error state, by referring to the countermeasure in case of the printer in the property of the printing data being busy or in error state, the printer driver corresponding to printer A is selected automatically, and printing is executed in the printer A.

Thus, according to the printing system and method of the embodiment of the invention, the printer driver optimum to printing of printing data is selected automatically, and printing is executed by the printer corresponding to the selected printer driver.

OTHER EMBODIMENTS

Various modifications will become possible for those skilled in the art after receiving the teachings of the present disclosure without depending from the scope thereof.

Thus the invention includes various embodiments not mentioned herein. Therefore, the technical scope of the invention should be determined only by the following claims which are reasonable and rational from the above explanation.

What is claimed is:

1. A printing system for printing by a selected printer by selecting a desired printer from plural printers connected to a network comprising:

a virtual printer driver activated at a printing process start, for selecting from multiple printer drivers a printer driver of a printer optimum to printing of printing data among the plural printers, and making the optimum printer execute the printing of printing data by starting the selected printer driver, wherein the virtual printer driver comprises a printing condition memory for storing a printing condition set by the user;
   a printer driver selector for selecting a printer driver optimum for printing of the printing data by referring to the printing condition; and
   a status judging unit for judging the status of the printer corresponding to the selected printer driver;
   wherein said printing condition memory comprises:
      a priority rank memory for storing the priority rank of printing property of printing data; and
      a printer condition memory for storing the printing condition of every printer of printing data.

2. The printing system according to claim 1, wherein the printing property includes color or monochromatic selection of printing of printing data, number of copies, printing paper size, countermeasure in case of busy printer or error, type of application, and resolution.

3. A printing method for printing by a selected printer by selecting a desired printer from plural printers connected to a network comprising:

using a virtual printer driver activated at a printing process start to select from multiple printer drivers a printer driver of a printer optimum to printing of printing data among the plural printers, and using the virtual printer driver to make the optimum printer execute the printing of printing data by starting the selected printer driver, wherein the virtual printer driver selects the printer driver using a process comprising a step of setting the priority rank of printing property of printing data;
   a step of setting the printing condition of each printer of printing data;
   a printing property input step of entering printing property of printing data for executing printing;
   a printer driver selecting step of selecting a printing driver optimum for printing of the printing data by referring to the entered printing property, priority rank of printing property, and printing condition of each printer;
   a printer driver calling step of starting a selected printer driver; and
   a printing step of executing printing by a printer corresponding to the selected printer driver.

4. The printing method according to claim 3, wherein the printing property includes color or monochromatic selection of printing of printing data, number of copies, printing paper size, countermeasure in case of busy printer or error, type of application, and resolution.

5. A computer-readable recording medium storing a printing program for printing by a selected printer by selecting a desired printer from plural printers connected to a network for making a computer system execute the operation comprising:

a virtual printer driver activated at a printing process start, for selecting from multiple printer drivers a printer driver of printer optimum to printing of printing data among the plural printers, and making the optimum printer execute the printing of printing data by starting the selected printer driver, wherein the virtual printer driver activated at a printing process start comprises
   a process of setting the priority rank of printing property of printing data;
   a process of setting the printing condition of each printer of printing data;
   a printing property input process of entering printing property of printing data for executing printing;
   a printer driver selecting process of selecting a printing driver optimum for printing of the printing data by referring to the entered printing property, priority rank of printing property, and printing condition of each printer;
   a printer driver calling process of starting a selected printer driver; and
   a printing process of executing printing by a printer corresponding to the selected printer driver.

6. The computer-readable recording medium storing the printing program according to claim 5, wherein the printing property includes color or monochromatic selection of printing of printing data, number of copies, printing paper size, countermeasure in case of busy printer or error, type of application, and resolution.

* * * * *